US 6,552,789 B1

(12) United States Patent
Modro

(10) Patent No.: US 6,552,789 B1
(45) Date of Patent: Apr. 22, 2003

(54) ALIGNMENT DETECTOR

(75) Inventor: David H. Modro, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 177 days.

(21) Appl. No.: 09/718,574

(22) Filed: Nov. 22, 2000

(51) Int. Cl.[7] .................. G01B 11/00; G02B 23/02; G03H 1/00; H04N 7/00
(52) U.S. Cl. .................. 356/399; 359/14; 359/15; 359/399; 348/115; 345/7; 353/13
(58) Field of Search .................. 345/7; 359/14, 359/15, 399; 348/115; 353/13; 356/399

(56) References Cited

U.S. PATENT DOCUMENTS

| | | | |
|---|---|---|---|
| 4,429,219 A | * 1/1984 | Yochum et al. | 250/229 |
| 4,775,218 A | 10/1988 | Wood et al. | 345/7 |
| 6,201,905 B1 | * 3/2001 | Talbert | 385/19 |
| 6,343,863 B1 | * 2/2002 | Wood | 353/13 |

* cited by examiner

Primary Examiner—John R. Lee
Assistant Examiner—Kalimah Fernandez
(74) Attorney, Agent, or Firm—Nathan O. Jensen; Kyle Eppele

(57) ABSTRACT

An alignment detector is disclosed that determines whether a first element has been moved to a predetermined position relative to a second element. The detector includes an emitter that is secured within a first optical chamber. A first detector is secured within a second optical chamber. The first optical chamber is optically connected to the second optical chamber such that a signal emitted from the emitter is detectable by the detector. An occluding element at least partially obstructs the signal when the first element has been moved to the predetermined position.

18 Claims, 7 Drawing Sheets

ALIGNMENT DETECTOR

FIELD OF THE INVENTION

The invention relates to head-up displays, and more particularly, to a sensor arrangement that ensures that a moveable portion of the head-up display is appropriately aligned.

BACKGROUND OF THE INVENTION

Supplementary guidance systems such as head-up displays (HUD's) are becoming more common in aircraft and in other applications. A HUD includes a projector assembly, typically positioned above a pilot's head, which projects an image to a combiner. The combiner is a substantially transparent piece of machined glass that is typically secured to the interior roof of the cockpit and rotated into the pilot's field of view when in use. The combiner is designed to reflect certain wavelengths of light such that the pilot sees an image overlaid on what is seen through the combiner (and through the cockpit window). In an aircraft application, the image may include symbols that improve the situational awareness of a pilot which enhances the operation of the aircraft.

Because symbols or other images are overlaid on what the pilot views through the cockpit window, it is important that the images reflected by the combiner toward the pilot are reflected at a precise angle. If not reflected at the proper angle, the images will not be properly overlaid onto the real world view. The angular position of the combiner is critical to the proper positioning of the reflected images. FIG. 9 depicts a combiner 10 that uses a known method of detecting whether the combiner is properly aligned. Combiner 10 includes a non-rotatable portion 12 that is secured to the interior roof of an airplane cockpit (not shown). Stationary portion 12 includes an infrared emitter 14 and a linear detector 16. A rotatable portion 18 of combiner 10 includes a support frame 20 that holds a piece of machined glass 22 in place. A mirror 24 is attached to support frame 20. Mirror 24 reflects a signal 26 from emitter 14 and directs the signal to the linear detector. The emitter, mirror and detector are aligned so that the detector will detect the signal when the rotatable portion of the combiner is properly positioned to correctly align the reflected images into a pilot's field of vision. This method is described in greater detail in U.S. Pat. No. 4,775,218, issued to Wood et al, which is incorporated by reference herein in its entirety.

While this known method performs acceptably well, there are some drawbacks. For instance, the emitter and detector are typically not shielded from ambient light, and pulsing circuitry is therefore required to differentiate the measuring signal from ambient light. Dust may accumulate on the emitter, detector, and/or the mirror, or may otherwise interfere with signal 26, and thereby compromise the signal strength and integrity. Furthermore, it requires significant time to properly align the emitter, mirror and detector during assembly.

It is therefore an object of the invention to provide a combiner alignment detector that is shielded from ambient light.

It is another object of the invention to provide a combiner alignment detector that is simple to assemble and calibrate.

A feature of the invention is a compact detector assembly, substantially shielded from ambient light and other contaminates, that determines the correct position of the combiner by the amount of obstruction of an emitted signal.

An advantage of the invention is that proper alignment position may be inexpensively and simply determined.

SUMMARY OF THE INVENTION

The invention provides an alignment detector assembly that determines whether a first element has been moved to a predetermined position relative to a second element. The detector includes an emitter that is secured within a first optical chamber. A first optical detector is secured within a second optical chamber. The first optical chamber is optically connected to the second optical chamber such that a signal emitted from the emitter is detectable by the detector. An occluding element at least partially obstructs the signal when the first element has been moved to the predetermined position.

The invention also provides a combiner assembly for a head-up display. The combiner assembly includes a non-rotatable portion and a rotatable portion that is attached to the non-rotatable portion. The rotatable portion is selectively rotated from a stowed position to an operating position. An alignment detector detects whether the rotatable portion has been precisely rotated into the operating position. The alignment detector includes a detector housing that is secured to the non-rotatable portion of the combiner assembly, an emitter that is secured within a first chamber of the housing, and which emits a detectable signal, and a first detector that is secured within a second chamber of the housing. The first and second chambers are optically connected such that the detector detects the signal emitted from the emitter. The alignment detector also includes an occluding element that is attached to the rotatable portion. The occluding element at least partially occludes the optical connection between the first and second chambers when the rotatable portion is in the operating position.

The invention further provides a method of detecting whether a rotatable combiner for a head-up display is in a predetermined position. According to the method, a signal is emitted through a first opening and a second opening. The signal is detected after the signal has passed through the first opening and the second openings. The signal is interrupted between the first opening and the second opening when the combiner is in the predetermined position.

DETAILED DESCRIPTION OF THE DRAWINGS

Figure 1:
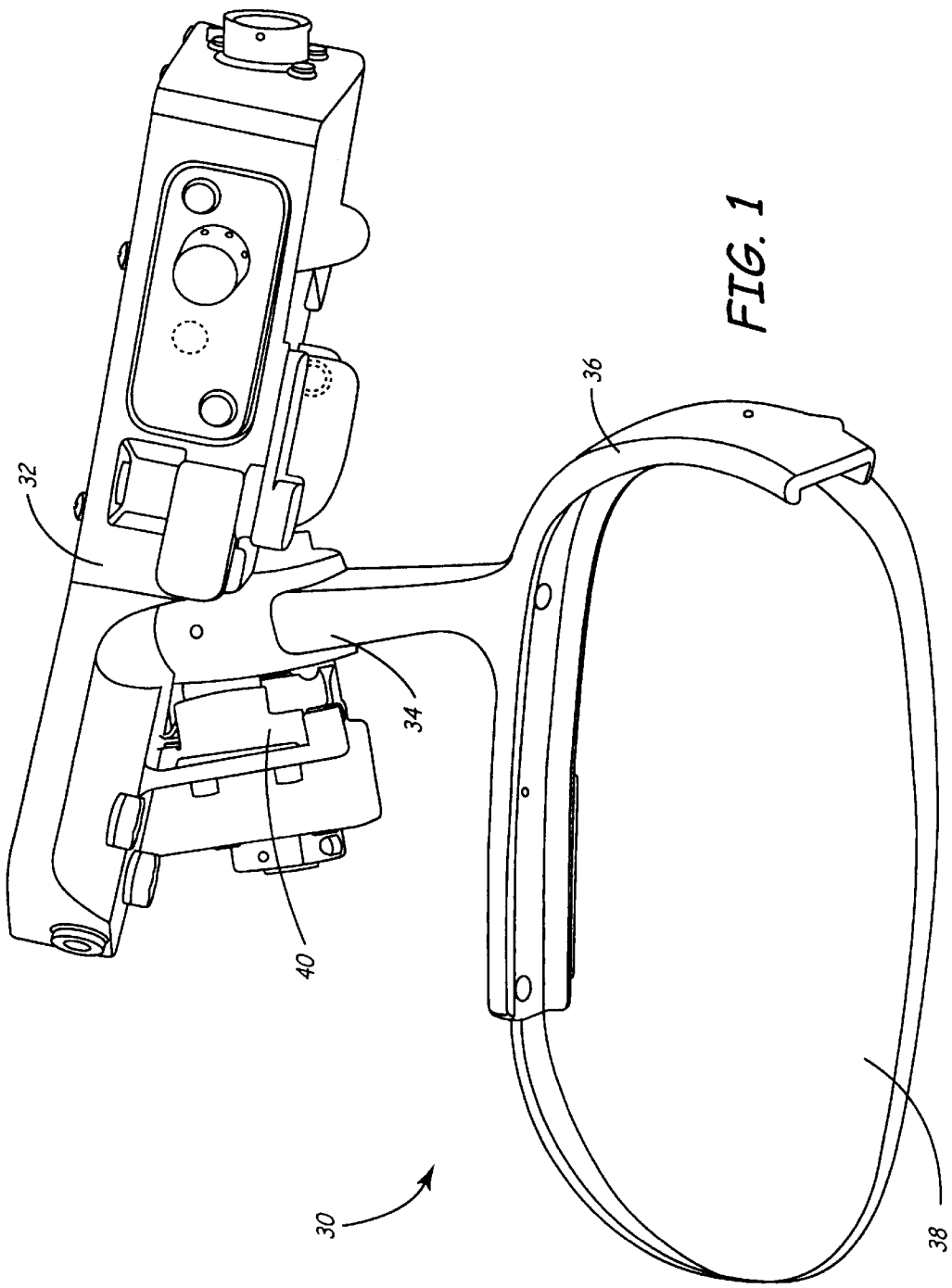
FIG. 1 is a perspective view of a combiner of a head-up display according to the invention.

FIG. 1 depicts a combiner 30 that is used with a head-up display. Combiner 30 includes a non-rotatable portion 32 that is secured, for example, to an the interior wall or roof (not shown) of an aircraft cockpit. Combiner 30 also includes a rotatable portion 34 that is rotatably attached to non-rotatable portion 32. Rotatable portion 34 includes a support frame 36 to which is attached a piece of machined glass 38. As described explained, rotatable portion 34 is rotated from a stowed position to an operating position, and glass 38 must be precisely aligned so that it reflects images into the pilot's field of vision.

Figure 2:
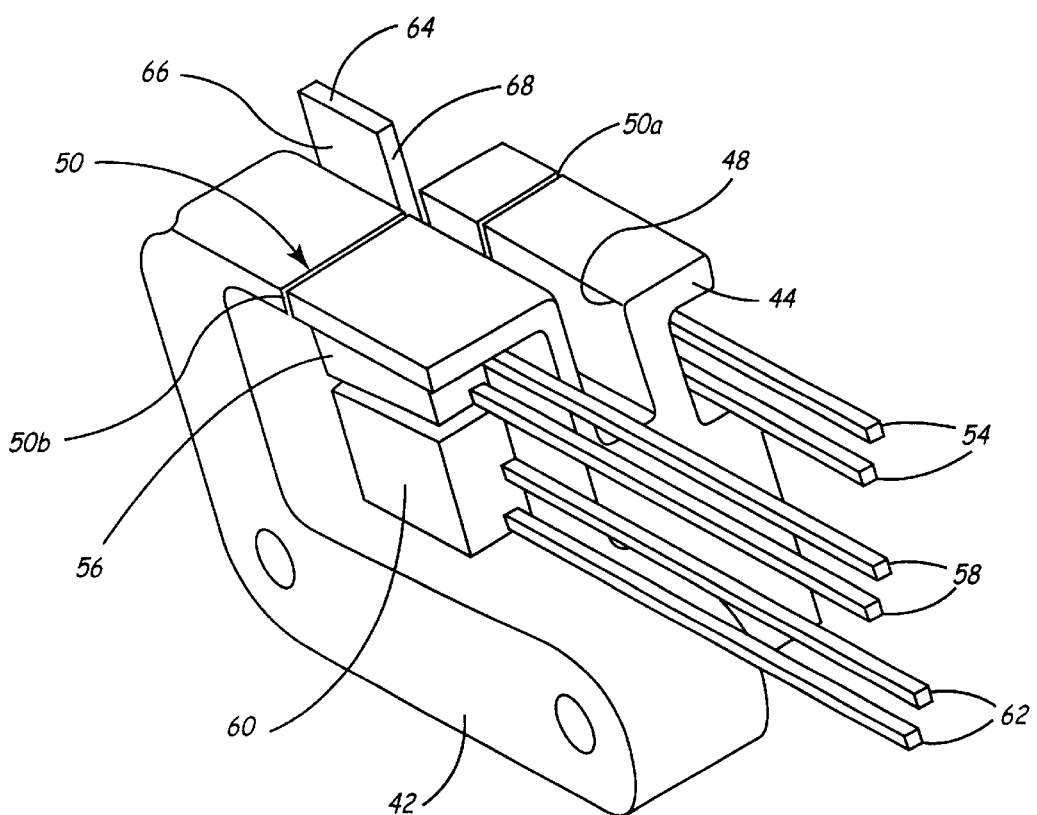
FIG. 2 is an isometric view of a combiner alignment detector according to one embodiment of the invention.
Figure 3:
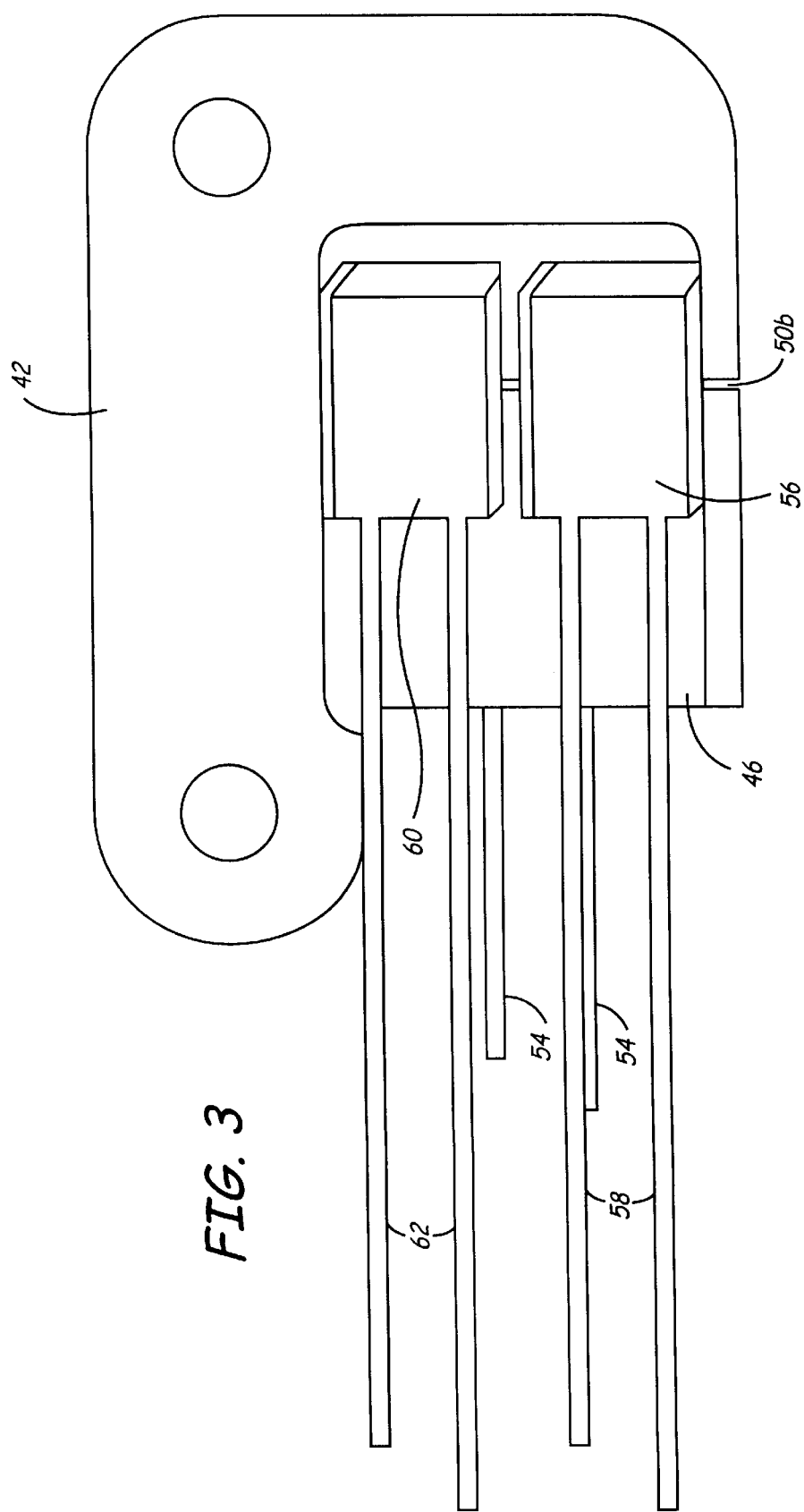
FIG. 3 is a side elevational view of the combiner alignment detector of FIG. 2.

To detect whether rotatable portion 34 is correctly aligned, the present invention provides a combiner alignment detector, which is shown generally by reference number 40 in FIG. 1. According to an embodiment depicted in FIGS. 2, 3 and 4, combiner alignment detector 40 includes a sensor housing 42 that is preferably attached to non-rotatable portion 32 of combiner 30. Sensor housing 42 includes a first chamber 44 and a second chamber 46 that are physically separated from each other by a gap or groove 48. Each of the first and second chambers has an opening into the groove. In the embodiment depicted in the Figures, the openings are part of a slit 50 that is cut or otherwise formed in sensor housing 42. The slit and groove provide a means of optical communication between the first and second chambers.

A signal emitter 52 is installed in first chamber 44 and is positioned such that a light signal s is emitted through a first part 50a of slit 50 and into groove 48. Electrical leads 54 extend from emitter 52 out of first chamber 44 and are electrically connected to a power supply (not shown) through control circuitry (not shown). A first photovoltaic detector 56 is installed in second chamber 46 and is positioned to detect signal s as the signal passes through groove 48 and through a second part 50b of slit 50. Electrical leads 58 extend from first detector 56 and are electrically connected to the control circuitry (not shown). A second photovoltaic detector 60 may also be installed in second chamber 46 and is configured to detect signal s as the signal passes through groove 48 and second part 50b of the slit. Electrical leads 62 extend from second detector 60 and are electrically connected to the control circuitry (not shown).

Figure 4:
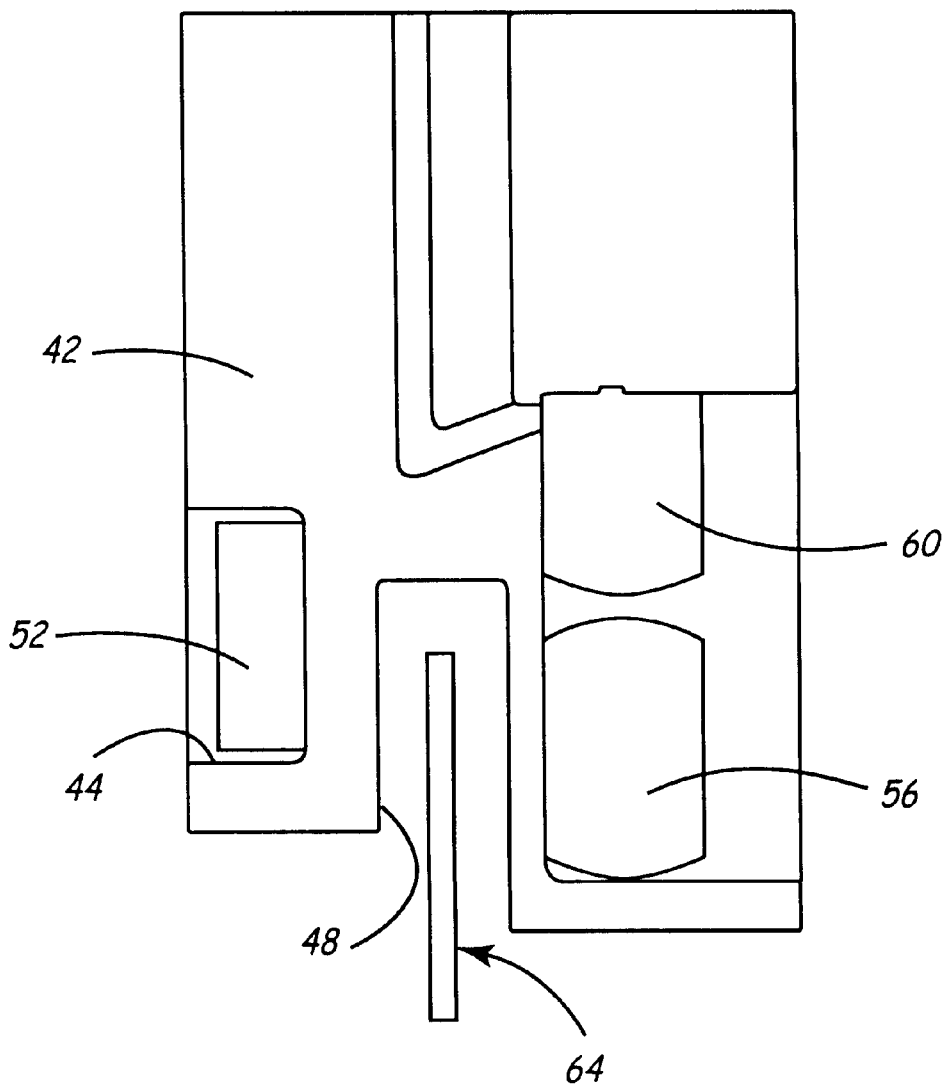
FIG. 4 is a rear elevational view of the combiner alignment detector shown in FIG. 2.

As shown schematically in FIG. 4, an occluding element 64 is attached to rotatable portion 34 and rotates as the rotatable portion is moved between the stowed and the operating positions. Occluding element 64 preferably has a substantially planar surface 66 with a thickness that, is less than the width of groove 48. Planar surface 66 is configured to enter groove 48 as rotatable portion is rotated from the stowed position to the operating position. Planar surface 66 in FIG. 2 includes a leading edge 68 that is the first portion of the planar surface to enter the groove when the rotatable portion is so rotated.

Figure 5:
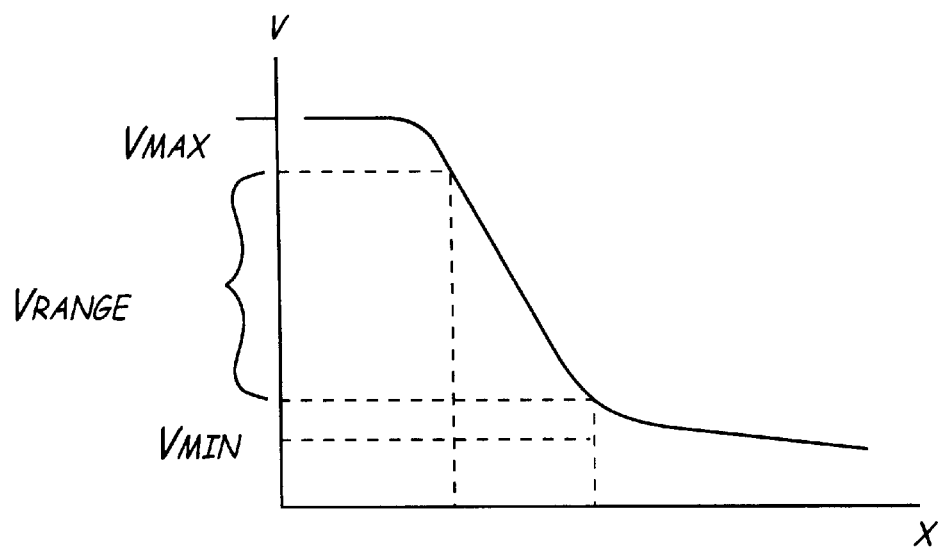
FIG. 5 is a graph showing acceptable levels of detected voltages.

Combiner alignment detector 30 operates as follows: emitter 52 emits signal s, which passes through first part 50a of slit 50, across groove 48, and through second part 50b of slit. Signal s is then detected by first detector 56, which registers a voltage level V. Voltage level V is proportional to the amount of signal s that is detected by first detector, and this in turn is dependent on the position of leading edge 68 of occluding element relative to slit 50. Since the occluding element is attached to rotating portion 34 of combiner 30, the voltage registered by first detector 56 is an accurate indicator of the angular position of rotating portion 34. Therefore, when rotatable portion 34 is not in the operating position, the first detector detects a maximum amount of the signal emitted from emitter 52 and registers a maximum voltage level $V_{max}$ (see FIG. 5). When rotatable portion approaches the operating position, occluding element rotates into groove 48 until a leading edge 68 of substantially planar surface 66 begins to interfere with the passage of signal s between emitter 52 and first detector 56. This occurs when leading edge 68 enters the plane of slit 50. As the occluding element passes between the first and second parts of the slit, the strength of signal s as detected by first detector decreases, and the voltage registered by the first detector proportionally decreases (FIG. 5). When the leading edge of the occluding element is completely past the slit, the signal is essentially completely blocked by the occluding element, and the strength of the signal as detected by the first detector therefore approaches a minimum value. Likewise, the voltage registered by the first detector approaches a minimum voltage level $V_{min}$. Minimum voltage level $V_{min}$ indicates that the rotatable portion has been over-rotated and is not in the operating position. When the voltage registered by the first detector is within a predetermined range $V_{range}$ between maximum voltage level $V_{max}$ and minimum voltage level $V_{min}$, the rotatable portion is in the proper operating position. As shown in FIG. 5, the predetermined voltage range may extend from about 110% of minimum voltage level $V_{min}$ to about 90% of maximum voltage level $V_{max}$. The magnitude of the predetermined range may be expanded or minimized to vary the tolerance level of the position of rotatable portion 34.

Second detector 60 is included as a reference detector. Note that second detector 60 is positioned such that occluding element 64 does not substantially interfere with the second detector's reception of signal s. The voltage registered by second detector 60 should remain substantially constant regardless of the position of the occluding element and may be therefore used as a reference voltage to monitor the output of emitter 52 for changes that may be caused by temperature changes, build-up of contaminants in the slit, and/or degradation of emitter 52 and/or first detector 56. The voltage registered by first detector 56 is divided by the voltage registered by the second detector 60 to cancel out such aberrations.

Second detector 60 may also be used to ensure that signal s is maintained at a constant strength. This is important because the voltage registered by first detector 56 determines whether rotating portion 34 is properly positioned. A change in the strength of signal s may therefore affect the accuracy of the position of rotating portion 34. This is overcome by varying the intensity of the signal emitted by emitter 52 if second detector 60 detects such a change.

Figure 6:
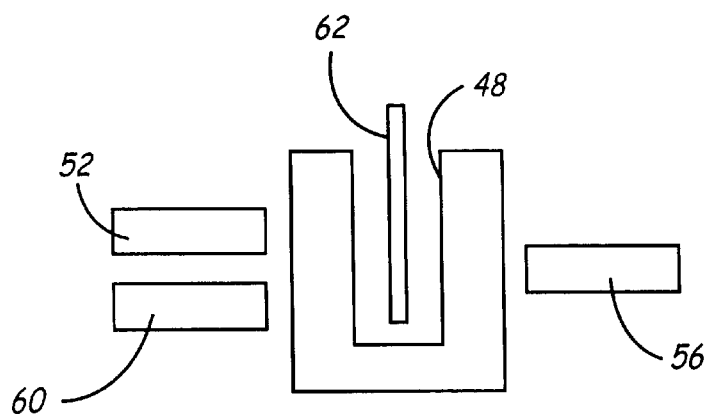
FIG. 6 is a schematic diagram showing an alternative detector arrangement according to the invention.

FIG. 6 shows that the second detector may be alternatively placed within first chamber 44 adjacent emitter 52 and designed to directly detect signal s from the emitter. Such an arrangement permits a less precise placement of occluding element 62 because the occluding element does not interfere with the detection of signal s by second detector 60.

Figure 7:
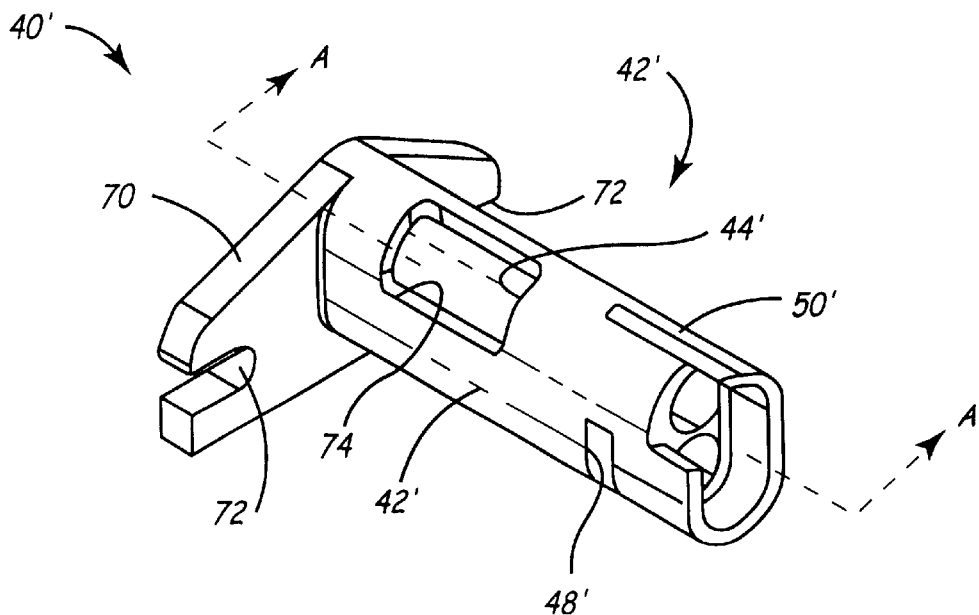
FIG. 7 is an isometric view of a combiner alignment detector according to another embodiment of the invention.
Figure 8:
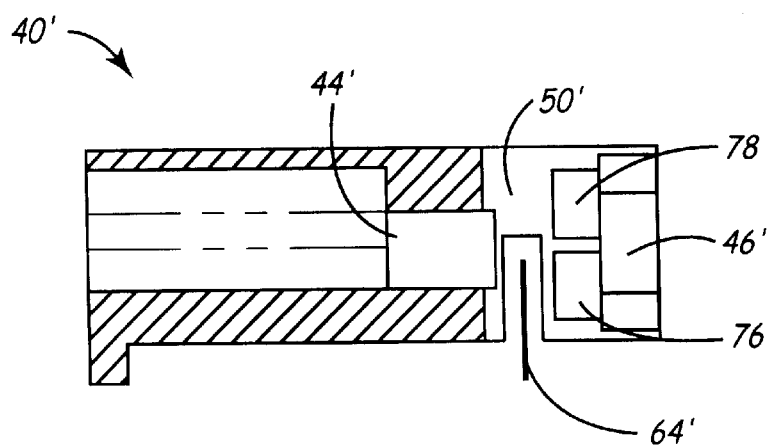
FIG. 8 is a sectional view taken along line A—A in FIG. 7.
Figure 9:
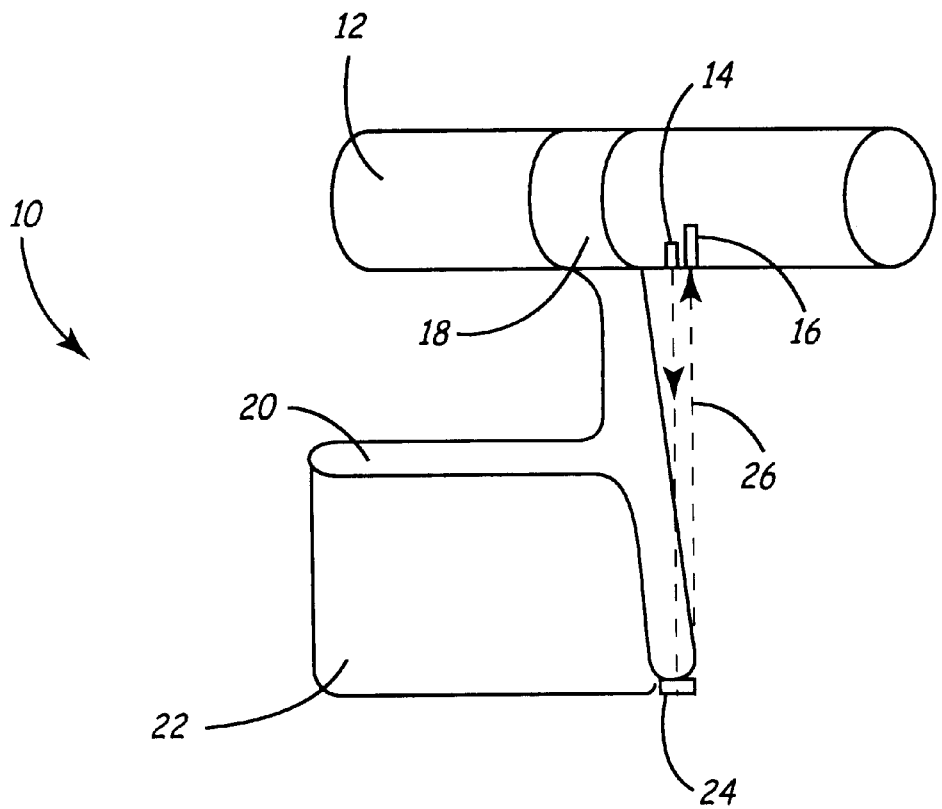
FIG. 9 is a perspective view of a combiner of a head-up display that uses known alignment techniques.

FIGS. 7 and 8 depict a combiner alignment detector 40' according to another embodiment of the invention. As combiner alignment detector 40' is similar to combiner alignment detector 40, similar components will be numbered similarly (with the addition of a prime symbol). Combiner alignment detector 40' includes a sensor housing 42' that is designed so that all but a flanged end 70 of the detector is inserted into a non-rotatable portion (not shown) of a combiner. Screws (not shown) fit through screw slots 72 to removably attach sensor housing 42' to the non-rotatable portion. Flanged end 70 remains relatively accessible so that the position of the sensor housing may be adjusted as desired by loosening the screws (not shown).

First chamber 44' is accessible via an opening 74 so that leads extending from emitter may pass therethrough. The first and second detectors are secured in second chamber 46' within recesses 76, 78, respectively, which further isolate the detectors from signal-degrading factors. Slit 50' is shown as passing through first chamber 44', second chamber 46', and groove 48'.

The embodiments of the invention effectively detect whether rotating portion 34 is in the operating position. For instance, an occluding element rotating one inch off the axis of rotation of rotating element 34 and passing between a 0.01 inch slit has been shown to detect an accurate angular position of approximately 17 arc-minutes. This level of angular accuracy is sufficient to maintain the images reflected by the combiner in a viewer's field of vision.

The invention may be varied in many ways. For instance, sensor housing 42 can be attached to rotatable portion 34 and occluding element 64 can be attached to non-rotatable portion 32. The invention has been described using a light emitter and photovoltaic sensors, but other types of sensors and detectors may also be used. The occluding element need not include a substantially planar surface, as long as there is some structure that passes between the emitter and the first detector to reduce the signal strength as a function of the angular position of rotating element 34. The invention may be used to properly align combiners used in aircraft HUDs, and may also be, used in HUDs in other types of vehicles. Furthermore, the invention would benefit stationary HUD and head-down display applications such as manufacturing, assembly, and in any other applications where supplementary visual guidance may enhance a worker's performance or effectiveness.

An advantage of the invention is that the accuracy of the angular position of the rotating element is increased. The use of a slit reduces the effective area of the first detector, which increases the sensitivity to changes in signal strength, which in turn, increases the sensitivity of changes in the movement of the rotating element.

Another advantage is that the amount of calculations needed to detect the combiner position is reduced. Consequently, dedicated circuitry that previously was necessary to make those calculations may be eliminated and the much simpler calculations of the present invention may be performed by existing processors within the head-up display.

Still another advantage is that the invention is much easier and less expensive to assemble. All that is necessary is for Occluding element 64 to be attached to rotating element 34. Sensor housing 42 is then attached to non-rotating element 32 and is adjusted to the proper position. This is in contrast to the lengthy calibration process that is needed for a mirror-based detector system.

Yet another advantage is that the invention is more reliable than previous alignment detector designs. The closed nature of the design and the use of second detector 60 greatly reduces the effects of emitter/detector aging and light interference from dust. Furthermore, the closed nature of the design substantially reduces light "noise," thereby eliminating the need to pulse the signal emitted by the emitter. This is a further reduction in required circuitry and overall complexity.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. An alignment detector assembly that determines whether a first element has been moved to a predetermined position relative to a second element, wherein the first element is rotatable relative to the second element, the detector comprising:

an emitter that is secured within a first optical chamber;

a first detector that is secured within a second optical chamber, wherein the first optical chamber is optically connected to the second optical chamber such that a signal emitted from the emitter is detectable by the detector; and an occluding element that at least partially obstructs the signal and at least partially prevents the signal from being detectable by the detector, when the first element has been moved to the predetermined position;

wherein the first element is a rotatable portion of a combiner mechanism and the second element is a non-rotatable portion of the combiner mechanism.

2. The alignment detector of claim 1, wherein the occluding element is attached to the first element.

3. The alignment detector of claim 1, further including a second detector that detects the signal emitted by the emitter, wherein the signal that is detected by the second detector is not occluded by the occluding element when the first element is in the predetermined position.

4. The alignment detector of claim 3, wherein the second detector is secured within the second chamber.

5. The alignment detector of claim 3, wherein the second detector is secured within the first chamber and is configured to detect signals coming from outside the first chamber.

6. The alignment detector of claim 1, wherein the first chamber has a first wall and the second chamber has a second wall, wherein the first and second walls are separated by a gap, and further including a first opening in the first wall and a second opening in the second wall, wherein the first and second openings are positioned such that the signal emitted by the emitter passes through the first opening, the gap, and the second opening to be detected by the first detector.

7. The alignment detector of claim 6, wherein the occluding element is configured to pass between the first and second openings to thereby occlude the signal emitted by the emitter.

8. The alignment detector of claim 6, wherein the first and second openings are slits that pass through the first and second walls.

9. The alignment detector of claim 1, further including a processor that determines a ratio of the strength of the signal to a predetermined reference level, wherein the first element is in the predetermined position when the ratio is within a predetermined range.

10. The alignment detector of claim 9, wherein the strength of the signal is a voltage level, and wherein the predetermined reference level is a reference voltage.

11. The alignment detector of claim 1, wherein the occluding element includes an edge that interferes with the signal and prevents the signal from being detected by the detector when the first element is in the predetermined position.

12. The alignment detector of claim 11, wherein the first and second chambers are included within a housing that is secured to the second element.

13. A combiner assembly for a head-up display, comprising:

a non-rotatable portion;

a rotatable portion that is attached to the non-rotatable portion and is selectively rotated from a stowed position to an operating position;

an alignment detector that detects whether the rotatable portion has been rotated into the operating position, wherein the alignment detector includes a detector housing that is secured to the non-rotatable portion of the combiner assembly, an emitter, secured within a first chamber of the housing, the emitter emitting a detectable signal, a first detector that is secured within a second chamber of the housing, wherein the first and second chambers are optically connected such that the detector detects the signal emitted from the emitter when the rotatable portion is not in the operating position, and an occluding element that is attached to the rotatable portion, wherein the occluding element at least partially occludes the optical connection between the first and second chambers when the rotatable portion is in the operating position.

14. The combiner assembly of claim 13, further including a second detector that is configured to detect the signal emitted from the emitter when the rotatable portion is in the operating position.

15. The combiner assembly of claim 14, further including control circuitry that adjusts the strength of the signal based upon inputs from the second detector.

16. A method of detecting whether a rotatable combiner for a head-up display is in a deployed position, comprising:

emitting a signal through a first opening and a second opening;

detecting the signal after the signal has passed through the first opening and the second openings;

interrupting the signal between the first opening and the second opening when the combiner is in the deployed position.

17. The method of claim 16, further including:

detecting the level of interruption of the signal between the first opening and the second opening; and determining that the combiner is in the deployed position when the level of interruption is within a predetermined range.

18. The method of claim 17, further including:

detecting a reference level of the signal;

comparing the reference level of the signal to the emitted signal; and adjusting the emitted signal to ensure that the emitted signal has a constant strength.

* * * * *